(12) United States Patent
Fischer

(10) Patent No.: US 6,375,217 B2
(45) Date of Patent: *Apr. 23, 2002

(54) GAS BAG RESTRAINT SYSTEM

(75) Inventor: Anton Fischer, Leinweiler (DE)

(73) Assignee: TRW Occupant Restraint Systems GmbH & Co. KG, Alfdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,492

(22) Filed: Mar. 30, 1999

(30) Foreign Application Priority Data

Apr. 2, 1998 (DE) ..................... 298 06 081 U

(51) Int. Cl.⁷ ............................................. B60R 21/22
(52) U.S. Cl. ................. 280/730.2; 280/728.2; 280/749
(58) Field of Search .............. 280/728.2, 730.1, 280/730.2, 733, 749

(56) References Cited

U.S. PATENT DOCUMENTS

| | | | | |
|---|---|---|---|---|
| 3,953,049 A | * | 4/1976 | Surace et al. ............... | 280/733 |
| 5,322,322 A | | 6/1994 | Bark et al. .................. | 280/730 |
| 5,439,247 A | | 8/1995 | Kolb ........................... | 280/730 |
| 5,707,075 A | | 1/1998 | Kraft et al. .................. | 280/730 |
| 5,788,270 A | * | 8/1998 | HÅland et al. ............. | 280/730.2 |
| 5,806,923 A | | 9/1998 | Tschäschke et al. ... | 297/216.13 |
| 5,865,462 A | * | 2/1999 | Robins et al. ............ | 280/730.2 |
| 5,868,421 A | * | 2/1999 | Eyrainer ................... | 280/730.2 |
| 5,884,937 A | * | 3/1999 | Yamada .................... | 280/730.2 |
| 5,957,487 A | * | 9/1999 | Stutz ......................... | 280/730.2 |

FOREIGN PATENT DOCUMENTS

| | | |
|---|---|---|
| DE | 29605896 U1 | 7/1996 |
| DE | 19628108 C1 | 6/1997 |
| EP | 0590518 A1 | 4/1994 |
| WO | WO9309977 | 5/1993 |

* cited by examiner

Primary Examiner—Lanna Mai
Assistant Examiner—Ruth Ilan
(74) Attorney, Agent, or Firm—Tarolli, Sundheim, Covell, Tummino & Szabo L.L.P.

(57) ABSTRACT

A gas bag restraint system for an occupant of a vehicle comprises a tube-shaped gas bag which in a free state extends in a straight line when inflated. The system further comprises at least one tensioning fabric or tensioning net having a large surface area and being adapted to be fastened to a vehicle. The gas bag is held on the tensioning fabric or tensioning net in a curved shape so that it, in an inflated state, endeavors to extend in a straight line whereby the tensioning fabric or tensioning net connected to the gas bag is tensioned and forms an additional restraining surface.

2 Claims, 1 Drawing Sheet

GAS BAG RESTRAINT SYSTEM

TECHNICAL FIELD

The invention relates to a gas bag restraint system for an occupant of a vehicle.

BACKGROUND OF THE INVENTION

U.S. Pat. No. 5,322,322 shows a restraint system which is constructed as a head gas bag. The head gas bag is tube-shaped and extends in the inflated state from the A-column obliquely upwards to beyond the B-column. This gas bag, however, only covers a relatively small portion of the side window of the front occupant. A net arranged on the upper edge of the gas bag can only serve as an additional small restraining surface. In addition, the tensioning force applied to the net by the always linearly extending gas bag is probably low, this being the reason why the net can not absorb any higher lateral forces without yielding greatly.

Furthermore, it is known to provide louver-like gas bags which extend from the A-column up to the C-column and are intended to offer protection laterally equally to the front and rear occupants, i.e. from the side window of the front to the side window of the rear occupants. The production of these gas bags, which cover a large area, is relatively expensive. In addition, a tube carrying gas extends along the roof frame, via which tube the gas is to flow as uniformly as possible into the gas bag. The gas volume for inflating this curtain-like gas bag is relatively great, so that extremely powerful gas generators have to be provided, which ensure a sufficiently quick filling.

BRIEF SUMMARY OF THE INVENTION

The invention provides a gas bag restraint system which is simply constructed, is able to be manufactured at a favorable cost and requires a relatively low gas volume despite a very large available restraining surface. The gas bag restraint system according to the invention furthermore distinguishes itself by a great force applied to the tensioning means and giving the tensioning means a stable position. The gas bag restraint system for an occupant of a vehicle according to the present invention comprises a tube-shaped gas bag with a longitudinal axis, which endeavours to extend in a straight line in an inflated state of the gas bag and which has an outer wall. The system further comprises at least one tensioning means arranged on the outer wall, by which tensioning means the gas bag is fastened to the vehicle. The tensioning means is designed with a large area and is arranged at such points of the outer wall and on the vehicle that the longitudinal axis of the tube-shaped gas bag extends in a curved shape in its inflated state. The tensioning means is tensioned by the curved gas bag and forms an additional restraining surface. The tube-shaped gas bag is, therefore, not tensioned between its two axial ends and able to extend linearly between these axial ends, rather, quite on the contrary, it is forced by the tensioning means to assume a curved profile, something which results in a high tensioning force. Thereby, the gas bag braces itself between the tensioning means or the sets of tensioning means and is fixed in position. The tube can above all be curved such that, by itself or together with the tensioning means, it shields regions which can not be covered by a gas bag which extends exclusively linearly, with the result that the gas bag, despite its small volume, can cover those regions of the vehicle which are likely to cause injury (the B-column or the side window on a level with the head).

The tensioning means can be a piece of fabric covering a large area, or a net, on which the gas bag is arrested at several points. For arresting, the gas bag can extend for example through slits in the piece of fabric.

The gas bag restraint system according to the invention is preferably a side impact restraint system and extends in front of one or more side windows.

The gas bag is in particular a fabric tube manufactured so as to be seamless, preferably even endless, which is deflected by the tensioning means by more than 30°, preferably more than 60°.

DETAILED DESCRIPTION OF A PREFERRED EMBODIMENT

Figure 2:
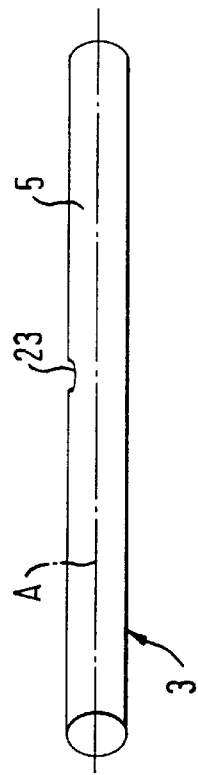
FIG. 2 shows a side view of the unfolded tensioning means according to FIG. 1, without the gas bag arranged thereon.
Figure 3:
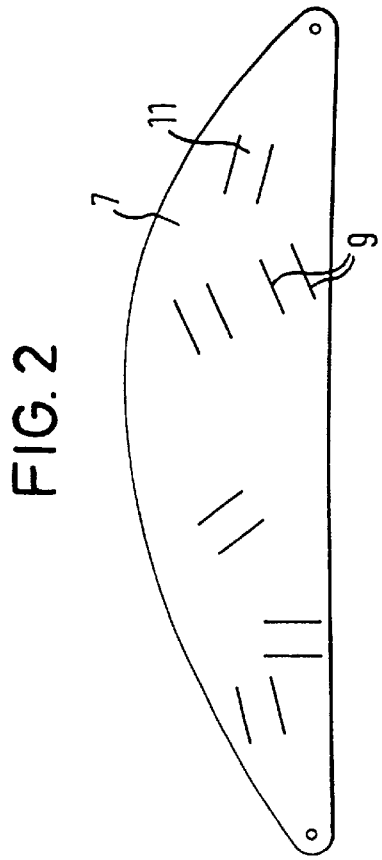
FIG. 3 shows the inflated gas bag which is shown in FIG. 1, not fastened to the tensioning means.
Figure 1:
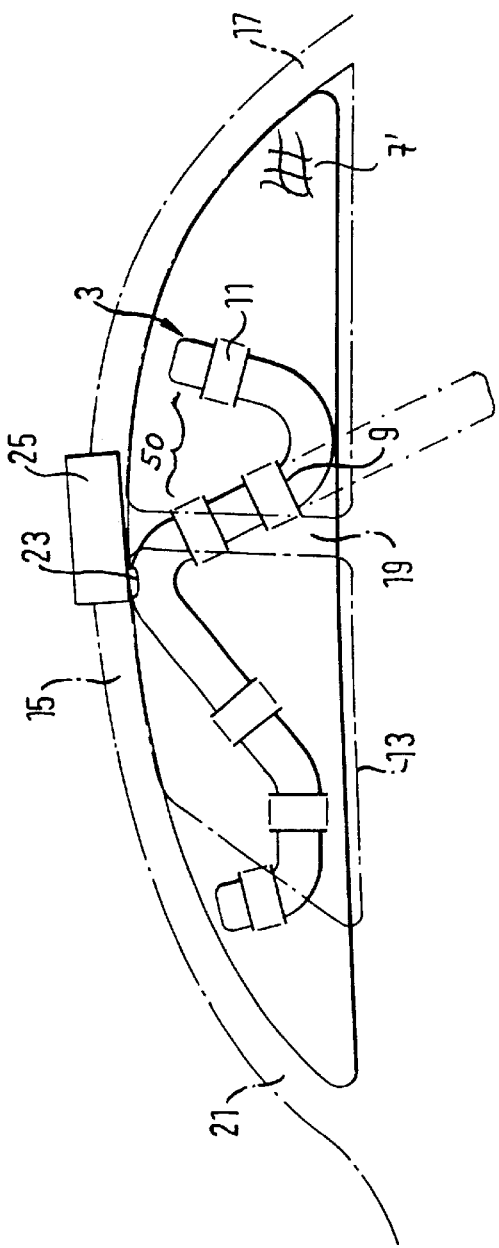
FIG. 1 shows a side view of an unfolded gas bag restraint system according to the invention, which is constructed as a side impact restraint system.

In FIG. 1 a gas bag restraint system, more precisely a side impact restraint system, is shown in the unfolded state. The restraint system consists of a tube-shaped, seamlessly and endlessly manufactured gas bag 3, which is also to be seen in FIG. 3. The geometry and the type of weave of the outer wall 5 of the gas bag are selected such that, without being fastened to a part on its outer wall 5, it endeavours to extend in a straight line in the inflated state, as FIG. 3 shows.

The gas bag 3 is fastened to a tensioning means 7 in the form of a shown fabric piece having a large area or a partly shown net 7'. For this, the fabric piece has numerous slits 9 through which the gas bag 3 is drawn. In addition, the gas bag is sewn by its outer wall to the bridge 11, each formed by a pair of parallel slits. The tensioning means 7 is adapted in its size and shape to the entire side window region of the vehicle into which it is incorporated. It extends in the unfolded state according to FIG. 1 approximately up to the lower end 13 of the side windows and up to the roof frame 15. In this region, the vehicle is illustrated by dot-and-dash lines. In addition, the tensioning means 7 extends from the A-column 17 over the B-column 19 up to the C-column 21, so that it offers protection to both the front and rear occupants. The tensioning means 7 is fastened at a few points to the A-column 17, the roof frame 15 and the C-column 21. The gas bag 3 is fastened to the tensioning means 7 such that it can not extend in a straight line, but rather must assume a curved profile. In the region of its front end which is closest to the A-column 17, it extends sharply downwards, then extends sharply upwards, in order to cover the large part of the B-column 19 and to protect the head of the occupant from a direct contact with the B-column, especially from contact with the seat belt deflection member affixed to the B-column. The result of this is a portion 50 curved in the shape of a U or a V, which portion is arranged such that the gas bag 3 tensions the tensioning means both in the longitudinal direction of the vehicle and also in the vertical direction. The gas bag 3 is curved in the region 50 by more than 60°, namely, about 110° as compared to the linear gas bag illustrated by dot-and-dash lines. Then the gas bag 3 extends slightly obliquely downwards, to finally extend more sharply upwards towards its rear end, where it partially covers the C-column. At its highest point in the unfolded state, the gas bag has an opening 23 which serves as inflation opening. Via this opening 23 the gas of an adjacent gas generator 25 flows into the gas bag 3.

The mode of operation of the gas bag restraint system according to the invention is explained below. In the folded state, gas bag 3 together with tensioning means 7 are hidden under a paneling which extends from the A-column 17 over the roof frame 15 up to the C-column 21. In the case of a side impact, the gas generator 25 inflates the gas bag 3. The covering is opened by the unfolding gas bag 3. The gas bag 3 shifts downwards and in so doing carries the tensioning means 7 with it. The gas bag 3 endeavours to unfold linearly which, however, it can not because of its fastening to the tensioning means 7. Thereby, a tensioning force is produced, so that the tensioning means 7 is braced between the fastening points on the vehicle and covers the entire side window region together with the gas bag 3, like a safety cloth. The unfolding of the gas bag 3 takes place very quickly, because it has a relatively small volume. A gas supply pipe is not necessary. As the tube is manufactured endless and without a longitudinal seam, it is very stable and can withstand high opening pressures. The tube is coated on the inside and, because it has no seam, is very gas-tight. The tensioning means 7, covering a large area, does not require any coating and can be of a relatively moderately-priced fabric. The gas bag 3 is guided in particular along those zones of the rear side window region with which the head of the rear occupant could most probably come into contact.

What is claimed is:

1. A gas bag restraint system for an occupant of a vehicle, said system comprising a tube-shaped gas bag which in a free state extends in a straight line when inflated, and comprising at least one tensioning means having a large surface area and being adapted to be fastened to a vehicle, said gas bag being held on said tensioning means in a curved shape so that said gas bag, in an inflated state, endeavors to extend in a straight line whereby said tensioning means connected to said gas bag is tensioned and forms an additional restraining surface;

said tensioning means being one of a fabric piece and a net, said gas bag being arrested on said one of a fabric piece and a net at several points;

said tensioning means having slits which form said points for arresting said gas bag, said gas bag extending through said slits in said tensioning means.

2. An apparatus for helping to protect a vehicle occupant, comprising:

a vehicle having an A-column, a B-column and a C-column; and a side impact gas bag restraint system for helping to protect the vehicle occupant, said restraint system comprising:

an inflatable tube-shaped gas bag, an inflator for inlfating said gas bag, and a non-inflatable tensioning means comprising a fabric material attahed to the A-column and the C-column of the vehicle, said tensioning means having a series of slits forming bridges of material for passing through said gas bag, said gas bag, when inserted through said bridges, forming a zigzag pattern, said gas bag, when in an inflated state and when not inserted through said bridges, extending in a straight line, said gas bag, when in an inflated state and when inserted through said bridges, extending in a zigzag pattern and tensioning said tensioning means.

* * * * *